May 4, 1965   E. W. CONKLIN   3,181,874
OUTSIDE MOUNTED BALANCED SEAL
Filed Dec. 3, 1962
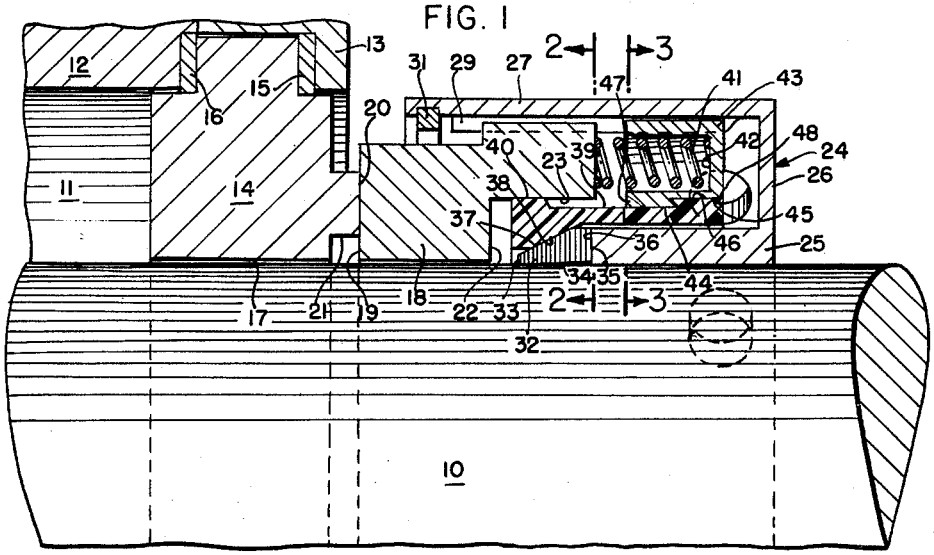
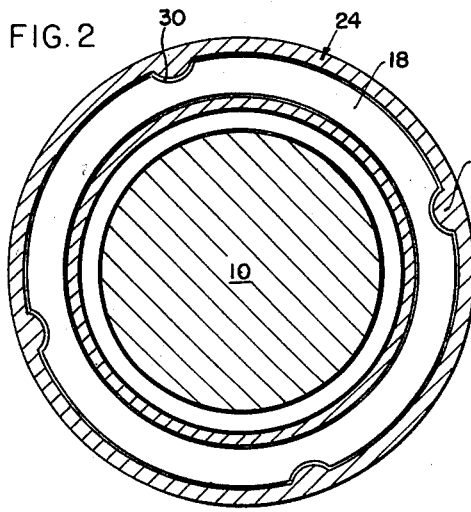
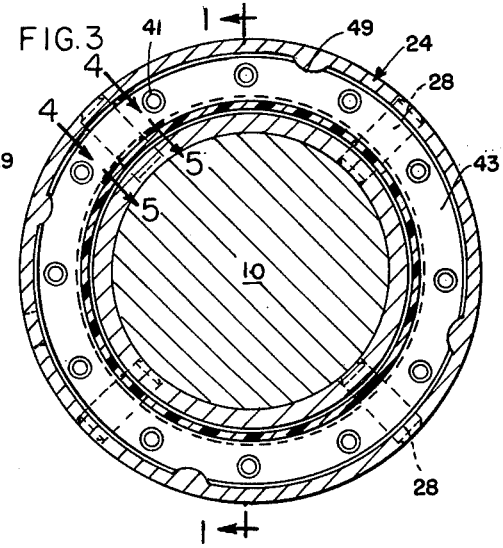
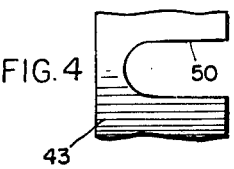
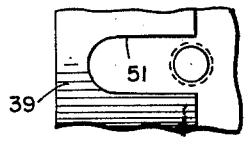
INVENTOR:
ELMER W. CONKLIN
BY
*Charles F. Vytlacil*
ATT'Y

United States Patent Office 3,181,874
Patented May 4, 1965

3,181,874
OUTSIDE MOUNTED BALANCED SEAL
Elmer W. Conklin, Barrington, Ill., assignor to Crane Packing Company, Morton Grove, Ill., a corporation of Illinois
Filed Dec. 3, 1962, Ser. No. 241,686
9 Claims. (Cl. 277—86)

This invention relates to rotary mechanical seals and particularly to that class of such seals known as outside balanced seals.

A rotary mechanical seal of the outside balanced type has been proposed which is particularly designed for corrosive fluids and for above average temperatures. Such seal has cooperating relatively rotatable primary sealing washers, and flexible secondary seals of polytetrafluoroethylene for sealing the washers to the shaft and housing of the apparatus to be sealed. In said prior seal, pressure of the fluid being sealed is used to assist in effecting a secondary seal, and springs are used to provide a minimum pressure upon the secondary sealing elements to assure a fluid-tight seal at the secondary seal when the apparatus is inoperative. The springs, however, are so arranged that they must necessarily be exposed to the fluid being sealed. If such fluid is of a corrosive nature, then the springs, of course, would be corroded by the fluid and would deteriorate at an accelerated rate.

The principal object of this invention is the provision of an outside balanced rotary mechanical seal using polytetrafluoroethylene secondary seals wherein the springs for supplying the minimum operating pressure for the secondary seals are not in contact with the fluid being sealed.

A specific object of this invention is the provision of a secondary seal made of polytetrafluoroethylene wherein novel means are used to attach the seal to the metallic spring retainer used to supply minimum operating pressure to the secondary seal.

Another specific object of this invention is the provision of a secondary seal made of polytetrafluoroethylene and having short radially extending flanges at the ends thereof, giving it a spool form, one end of said secondary seal with its flange being contractible by a metallic, ring-shaped spring retainer through which said flanged end is passed to provide an axially interlocking connection with the spool and spring retainer.

These and other objects of this invention will become apparent from the following detailed description when taken together with the accompanying drawings in which FIG. 1 is a quarter sectional view of a rotary mechanical seal of the outside balanced type embodying the features of this invention;

FIGS. 2 and 3 are respectively left and right transverse sections through the seal of FIG. 1 taken along lines 2—2 and 3—3 of FIG. 1 and in the direction of the arrows at the ends of said lines 2—2 and 3—3;

FIG. 4 is a fragmentary plan view of a portion of the spring retainer of the seal of FIG. 1; and FIG. 5 is a fragmentary plan view of a portion of the secondary seal of FIG. 1.

Referring now to the drawings for a detailed description of a preferred embodiment of this invention, the seal is shown as applied to a shaft 10, which may be the drive shaft of a pump or the like and which passes through a chamber 11 formed in the housing 12 of said pump. Said chamber may be the normal seal or packing chamber and is closed at its outside end to a large extent by a cover plate 13 and a seal seat 14, the latter being clamped between cover plate 13 and housing 12 through intermediate gaskets 15 and 16 and appropriate bolts (not shown). Said seal seat 14 has a small clearance 17 with respect to shaft 10 through which fluid from chamber 11 may pass.

The seal of this invention is comprised of a rigid sealing washer 18 having a radially disposed sealing surface 19 adapted to be contacted by a similarly radially disposed sealing surface 20 formed on an axially extending nose 21 on seal seat 14. Washer 18 has a recess 22 in its central righthand side as viewed in FIG. 1, said recess being defined in part by a cylindrical wall 23, the diameter of which is greater than the internal diameter of nose 21. With these relative dimensions, fluid under pressure finding its way through clearance 17 and past washer 18 into recess 22 will create a greater total pressure upon washer 18 in a lefthand direction as viewed in FIG. 1 than it will in the opposite direction upon the exposed portion of surface 19 within the confines of nose 21. This pressure differential is utilized to assist in holding said washer against nose 21.

Axially spaced from washer 18 is a rigid retainer 24 which includes a cylindrical inner part 25 having a sliding fit with respect to shaft 10, a radially extending rear wall 26 and a forwardly extending outer wall 27. Said outer wall 27 extends over washer 18 and provides a housing therefor. Said retainer 24 is secured to shaft 10 for rotation therewith by a plurality of set screws 28 (FIG. 3). A rotary driving, axially sliding connection is provided between outer wall 27 and washer 18 through a plurality of radially inwardly extending ribs 29 which are received in notches 30 (FIG. 3) in washer 18. Said ribs and notches are disposed in an axial direction to permit such relative axial movement between the retainer and washer. A snap ring 31 serves to hold washer 18 within wall 27.

The secondary seal is of a wedge type and is comprised of a ring 32 made of polytetrafluoroethylene and tapered in radial cross section to form a lip 33 which is adapted to contact shaft 10. The inner surface 34 of ring 32 is slightly tapered with respect to shaft 10 to promote the formation of a line contact at lip 33 with the surface of shaft 10. The line contact promotes a concentration of stress over a small area of the lip which deforms the material of the ring against shaft 10 to insure a fluid-tight seal with the shaft. The rear surface 35 of ring 32 is radially disposed and abuts upon a similarly radially disposed surface 36 on the end of the cylindrical inner part 25 of retainer 24. The outer surface 37 of ring 32 is tapered and contacts a similarly tapered surface 38 on the interior of a polytetrafluoroethylene secondary sealing sleeve 39 which encircles cylindrical part 25 of retainer 24. Said sleeve has an outwardly extending rib 40 which contacts cylindrical wall 23 on washer 18 to form a fluid-tight seal therewith.

It may be apparent from the description thus far given that when sleeve 39 is urged to the right as viewed in FIG. 1, while ring 32 is held against axial movement, a wedging action is created which tends to urge lip 33 into contact with shaft 10 and, at the same time, causes a radially outwardly directed pressure to be exerted upon the lefthand end of sleeve 39 as viewed in FIG. 1 to hold rib 40 against wall 23 of washer 18. The wedging pressure also serves to provide a seal between the contacting surfaces 37 and 38 of ring 32 and sleeve 39.

The requisite axial pressure for urging sleeve 39 against ring 32 is provided in part by a series of springs and in part by the pressure of the fluid in recess 22. The spring pressure is derived from a plurality of helical springs 41 which bear at one end against washer 18 and are received at their other ends in appropriate recesses 42 formed in a spring retainer 43 received in retainer 24 and encircling sleeve 39. The inner surface 44 of spring retainer 43 has a counterbore 45 formed in the righthand end thereof as viewed in FIG. 1 into which extends a short flange 46 formed on the exterior of sleeve 39. The axially abutting surfaces of short flange 46 and retainer 43 are so inclined relative to one another and to a radial plane passing through shaft 10 that axial movement of the retainer toward the right as viewed in FIG. 1 relative to the sleeve tends to lock the retainer and sleeve radially together. Thus, the action of springs 41 upon spring retainer 43 tends to urge said retainer to the right as viewed in FIG. 1 and this force is transmitted through short flange 46 on sleeve 39 to said sleeve, thereby urging said sleeve against ring 32 to provide the wedging and sealing action required between the shaft, ring 32, sleeve 39 and washer 18.

It may be observed that the inner surface 44 of the forward end of spring retainer 43 extends radially inwardly of the exterior surfaces of outwardly extending rib 40 and short flange 46. This would normally pose an assembly problem which, however, is solved in the present instance by causing short flange 46 to be radially contracted by retainer 43 as said retainer is moved to the left over flange 46. To facilitate such contraction, inner surface 44 has a chamfer 47 formed in the forward edge thereof and the outer surface of short flange 46 has a chamfer 48 formed in its corner region. Thus a camming action is produced by relative movement of the two chamfers 47 and 48 which causes the sleeve 39 to yield and contract because of its lower physical strength as compared to the strength of the spring retainer 43. Flange 46 springs back after surface 44 has passed thereover and produces the axial locking arrangement shown in FIG. 1.

Spring retainer 43 may be formed with external notches 49 (FIG. 3) which also cooperate with ribs 29 to prevent relative rotation between spring retainer 43 and washer 18.

To conserve axial space, set screws 28 are made to pass through appropriate notches 50 in retainer 43 and 51 in sleeve 39, said notches being sufficiently wide and long to avoid interfering with the free axial movement of spring retainer 43 and sleeve 39 under the action of springs 41 and the fluid pressure in recess 22.

It may be noted that recess 22 in which fluid from chamber 11 may be found is completely sealed by sleeve 39 and ring 32 so that springs 41 are not in contact with the fluid in chamber 11 and hence are not subjected to any corrosive action which such fluid may produce. It may be noted further that ring 32 and sleeve 39 are independent of one another so that if ring 32 should shrink because of a reduction in temperature following a temperature rise, sleeve 39 may be drawn to the right as viewed in FIG. 1 by the fluid under pressure in recess 22 and by the springs 41 to take up for such shrinkage and thereby continue to maintain a seal between shaft 10 and washer 18.

Sleeve 39 may be made from two different types of polytetrafluoroethylene which are then united in a mold to form a single sleeve. Thus the polytetrafluoroethylene within spring retainer 43 may be of the glass-filled type for better strength characteristics and the remainder of the sleeve may be of the usual clear polytetrafluoroethylene which is best suited for secondary seal purposes.

It is understood that the foregoing description is merely illustrative of a preferred embodiment of this invention and that the scope of the invention therefore is not to be limited thereto, but is to be determined by the appendant claims.

What is claimed is:

1. A rotary mechanical seal for effecting a fluid-tight running seal between relatively rotatable devices, said seal comprising a rigid sealing washer encircling one of said relatively rotatable devices and having a counterbore in one end thereof, a rigid abutment on said one of said relatively rotatable devices axially spaced from the sealing washer, a spring retainer axially spaced from the sealing washer, said retainer being axially movable relative to said rigid abutment, a cylindrical secondary sealing element, means interlocking said cylindrical secondary sealing element and said spring retainer in an axial direction to cause said secondary sealing element to move axially with said retainer, spring means compressed between said sealing washer and said spring retainer, and wedge means in the counterbore contacted by said cylindrical secondary sealing element and reacting axially against said abutment for expanding the secondary sealing element radially against the sealing washer counterbore when said cylindrical secondary sealing element is moved axially against said wedge means.

2. A rotary mechanical seal as described in claim 1, said wedge means comprising a ring of wedge shape in radial cross section, said abutment and ring having surfaces abutting one another in an axial direction and said secondary sealing element having a wedge part axially movable relative to the wedge ring and contacting said wedge ring to expand said secondary sealing element as aforesaid.

3. A rotary mechanical seal as described in claim 1, said interlocking means comprising a radially inwardly projecting part on the spring retainer and a radially outwardly projecting part on the cylindrical secondary sealing element, said parts being movable relative to one another in one axial direction of movement of the spring retainer relative to the cylindrical secondary sealing element.

4. A rotary mechanical seal as described in claim 1, said interlocking means comprising a radially inwardly projecting circumferential rib on the spring retainer and a radially outwardly projecting circumferential rib on the cylindrical secondary sealing element, the outside diameter of the outwardly projecting rib being greater than the internal diameter of the radially inwardly projecting rib, said cylindrical sealing element and its rib being radially contractible to pass through the rib on the retainer.

5. A rotary mechanical seal as described in claim 1, means interlocking said sealing washer and retainer against relative rotation but permitting relative axial movement therebetween, and means interlocking the spring retainer and the abutment against relative rotation, but permitting relative axial movement therebetween.

6. A rotary mechanical seal as described in claim 1, said spring retainer and cylindrical secondary sealing element having radially aligned openings, and a set screw disposed in said openings and securing the abutment to the said one of said relatively rotatable devices.

7. A rotary mechanical seal as described in claim 1, said wedge means being disposed within said secondary sealing element and having a lip in contact with the secondary sealing element and deformable radially inwardly thereby.

8. A rotary mechanical seal as described in claim 1, said secondary sealing element and wedge means being made of polytetrafluoroethylene.

9. A rotary mechanical seal as described in claim 1, said secondary sealing element being made in part of clear polytetrafluoroethylene and in part of glass-filled polytetrafluoroethylene.

References Cited by the Examiner
UNITED STATES PATENTS 2,108,760    2/38    Weiher _____ 277—87

EDWARD V. BENHAM, Primary Examiner.

SAMUEL ROTHBERG, Examiner.